United States Patent [19]

Lee

[11] Patent Number: 5,657,228

[45] Date of Patent: Aug. 12, 1997

[54] DYNAMIC BEHAVIOR TEST SYSTEM OF A VEHICLE AND METHOD THEREOF

[75] Inventor: Unkoo Lee, Kyungki-do, Rep. of Korea

[73] Assignee: Hyundai Motor Company, Seoul, Rep. of Korea

[21] Appl. No.: 487,702

[22] Filed: Jun. 7, 1995

[51] Int. Cl.⁶ .................................................. G01M 17/00

[52] U.S. Cl. .................. 364/424.034; 348/94; 348/148; 73/117

[58] Field of Search ................. 364/424.034, 424.04, 364/550, 551.01; 73/116, 117; 348/94, 95, 118, 119, 142, 148, 180

[56] References Cited

U.S. PATENT DOCUMENTS

| | | | |
|---|---|---|---|
| 4,455,866 | 6/1984 | Barrigar | 73/117 |
| 4,639,878 | 1/1987 | Day et al. | 348/94 |
| 4,807,027 | 2/1989 | Muto | 348/148 |
| 5,051,906 | 9/1991 | Evans, Jr. et al. | 348/119 |
| 5,083,200 | 1/1992 | Deffontaines | 348/148 |

*Primary Examiner*—Gary Chin
*Attorney, Agent, or Firm*—Birch, Stewart, Kolasch & Birch, LLP

[57] ABSTRACT

A dynamic behavior test system of a vehicle includes a circumferential driving road, a vehicle support for placing a test vehicle thereover, the test vehicle being marked with at least two reference points defining a reference line, a driving member for rotating the vehicle support along the circumferential driving road, a device for detecting changes in the positions of the at least two reference points when the vehicle support with the test vehicle placed thereover is rotated along the circumferential driving road, and a device for calculating a value representing dynamic behaviors of the test vehicle based on detected changes in the positions of the at least two reference points.

15 Claims, 3 Drawing Sheets

DYNAMIC BEHAVIOR TEST SYSTEM OF A VEHICLE AND METHOD THEREOF

BACKGROUND OF THE INVENTION

1. Field of the Invention

The invention relates to a dynamic behavior test system of a vehicle and, more particularly, to a test system which can precisely and easily test the dynamic behaviors of a vehicle such as rolling and pitching generated in a vehicle.

2. Description of Related Art

Generally, a vehicle receives vibration and impact from a road surface, in addition to dynamic behaviors such as rolling and pitching by a side force during cornering and an inertial force during urgent braking.

These behaviors including rolling and pitching influence ride comfort, stability and safety of the vehicle. Accordingly, the dynamic behavior is minimized by a proper mechanical design of the vehicle, thereby improving the ride comfort, stability and safety of the vehicle.

To properly accomplish the mechanical design of the vehicle, the dynamic behavior generated by the side force and front and rear forces of the vehicle during driving should be repeatedly measured to select the optimal mechanical design.

The behavior of the vehicle is caused by the inertia force applied on the center of gravity of the vehicle. However, it is substantially impossible to precisely apply the outer force on the center of the gravity of the vehicle so that it is impossible to precisely measure the dynamic behavior of the vehicle.

SUMMARY OF THE INVENTION

The present invention is made in an effort to solve the problems described above. An object of the invention is to provide a dynamic behavior test system of a vehicle which can precisely apply a force on the center of gravity to test the dynamic behavior of the vehicle, thereby easily and precisely measuring rolling and pitching of the vehicle in addition to dive and squat characteristics and so on.

BRIEF DESCRIPTION OF THE DRAWINGS

Further objects and other advantages of the present invention will become apparent from the following description in conjunction with the attached drawings, in which.

DETAILED DESCRIPTION OF THE PREFERRED EMBODIMENT

Figure 1:
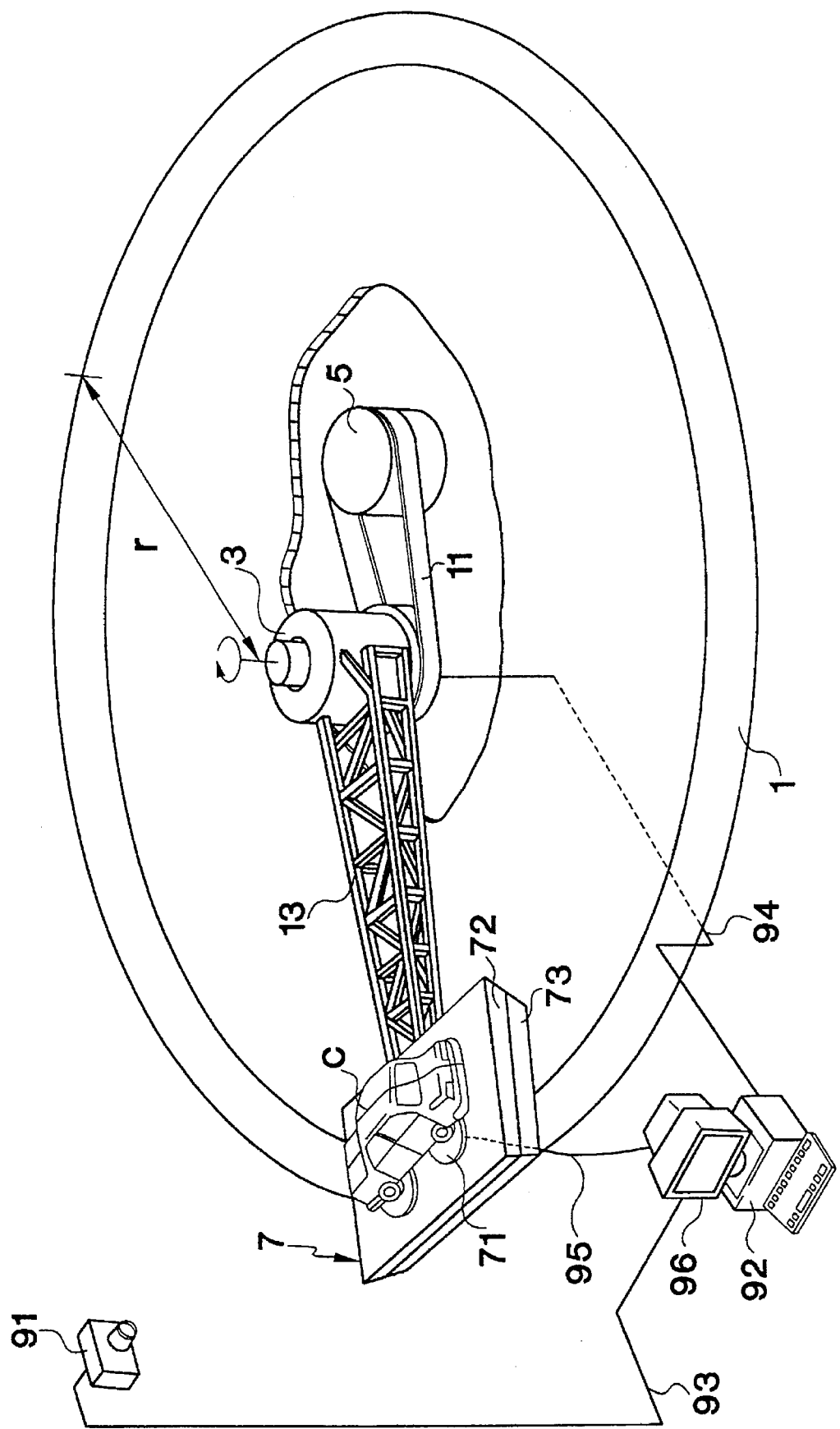
FIG. 1 is a schematic view of a dynamic behavior test system according to a preferred embodiment of the invention, wherein a test vehicle is in a position such that the test system can measure rolling.

Referring to FIG. 1, a dynamic behavior test system of a vehicle according to a preferred embodiment of the invention comprises a circumferentially disposed driving road 1, a driving member 3 disposed on a central portion of the circle defining the driving road, a power source 5 for delivering power to the driving member 3, a vehicle support 7 connected with the driving member 3 and disposed on the driving road 1, a camera 91 for photographing a dynamic behavior of a vehicle and an arithmetic and logic unit 92 for receiving signals from the camera 91 thereby calculating the dynamic behavior of the vehicle.

In this embodiment, the driving road 1 is formed with a pair of rails, and the driving member 3 is connected with the power source 5 by a rotary power delivering member 11, wherein the driving member 3 can also be integrally formed with the power source 5.

The vehicle support 7 includes an upper plate 72 where the vehicle is placed and a lower plate 73 connected with the driving member 3 by a connecting member 13. The upper plate 72 can rotate with respect to the lower plate 73 in the range of 0 to 180 degrees, to selectively measure a roll and a pitching by changing the arrangement of the vehicle. Further, there is a reacting force sensing portion 71 for sensing the reacting force of a wheel according to the behavior of the vehicle on the upper plate 72 of the vehicle support 7, and it will be described in detail with reference to FIG. 3.

The camera 91 and driving member 3 are connected with the arithmetic and logic unit 92 through lines 93 and 94 for transferring information, respectively. Accordingly, the information on the velocity of the driving member 3 and the behavior of the vehicle photographed by the camera 91 are transferred to the arithmetic and logic unit 92.

Figure 3:
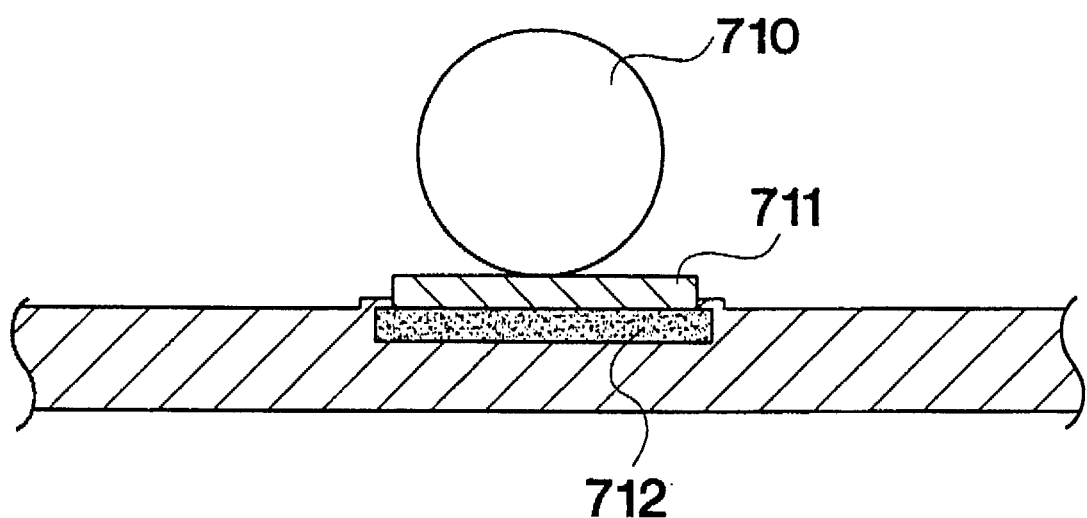
FIG. 3 is a sectional view of a reacting force sensing portion of a dynamic behavior test system according to a preferred embodiment of the invention.

On the other hand, as shown in FIG. 3, the reacting force sensing portion 71 is formed with a wheel support 711 for supporting a wheel 710 of a test vehicle and an air bearing 712 defined by a groove formed on the upper plate 72 and by the wheel support 711. A sensor (not shown) is provided on the reacting force sensing portion 71 for measuring the reacting force on the wheel 710 according to the behavior of the vehicle. Information on the sensed reacting force of the wheel is transferred to the arithmetic and logic unit 92 through a line 95.

The description of operation of a dynamic behavior test system according to an embodiment of the invention is as follows:

In FIG. 1, the test vehicle is disposed on the upper plate 72 of the vehicle support 7 in the direction of the circumference of the driving road 1 and each wheel of the vehicle is disposed on each reacting force sensing portion 71 to measure the behavior with respect to the roll of the vehicle.

A center line C marked on the vehicle is set to correspond to a data processed reference position of the screen of a monitor 96 by regulating the position of the camera 91.

Then, the vehicle support 7 starts to rotate on the driving road 1 by the driving member 3 driven by the power source 5.

At this point, when the radius of the driving road 7 is "r," the acceleration "a" is "v*v/r." Accordingly, by selecting a proper radius "r" and velocity "v," an aimed side force can be applied to the vehicle by a side acceleration. That is, for example, to obtain the acceleration of about 5 m/(s*s), in case the radius of the driving road 1 is 10 m, the velocity of the vehicle support 7 is about 7 m/s and in case the radius of the driving road 1 is 15 m, the velocity of the vehicle support 7 is about 8.5 m/s.

According to the method described above, the side force is applied to the vehicle thereby generating the roll, and the camera 91 catches this roll and transfers it to the monitor. The center line C marked on the vehicle is offset from the reference line due to the roll. The arithmetic and logic unit 92 processes the above by the internal software and data thereby calculating the roll center, the center of gravity and so on.

On the other hand, when the reacting force of the wheel generated by the reacting force sensing portion 71 is transferred to the arithmetic and logic unit 92 through the line 95, this data and the data transferred through the line 93, that is, the data on the center of gravity and roll center are cross-checked with each other thereby obtaining correct and accurate information.

Figure 2:
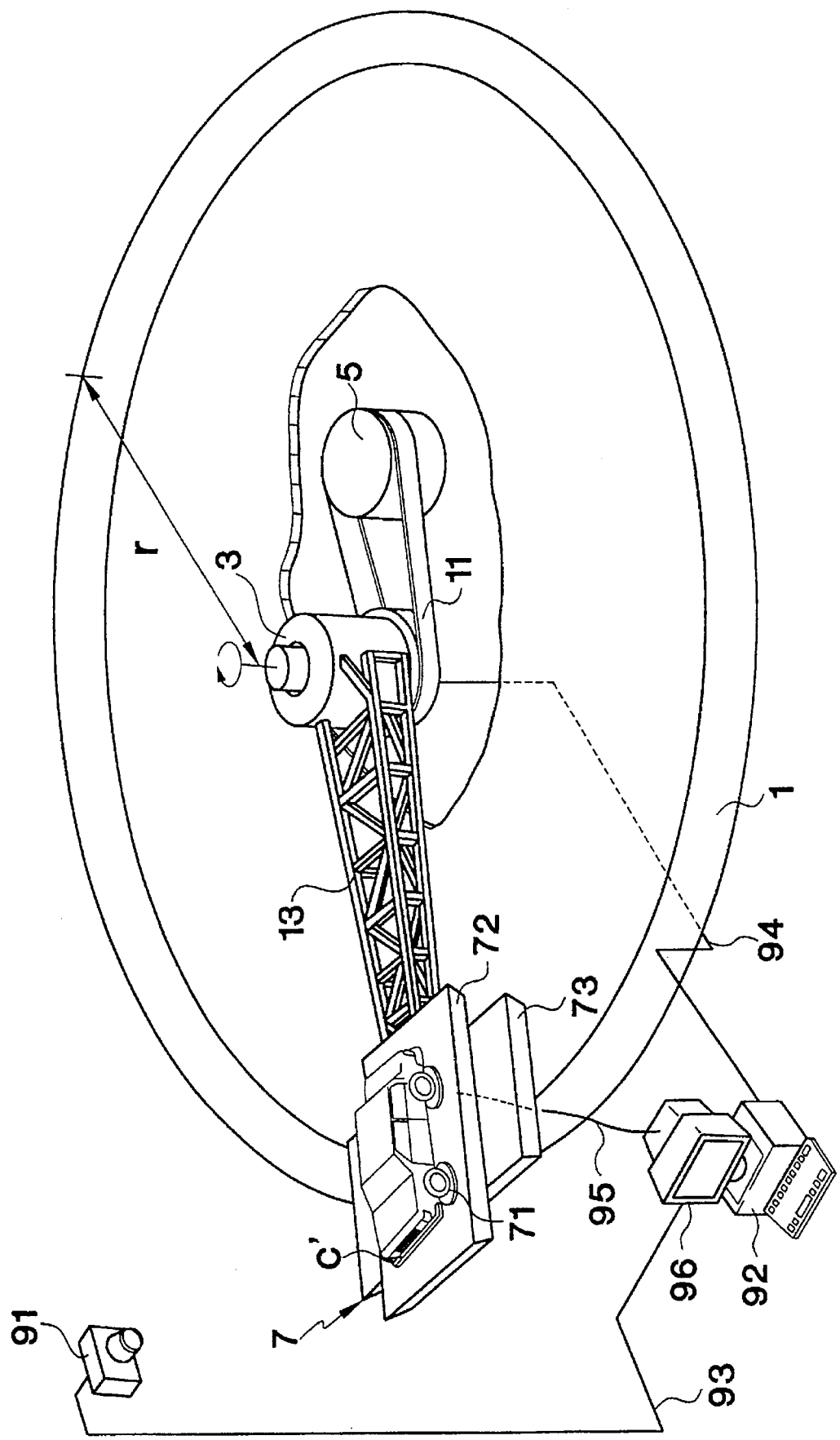
FIG. 2 is a schematic view of a dynamic behavior test system according to a preferred emodiment of the invention, wherein a test vehicle is in a position such that the test system can measure pitching having properties of dive nd squat.

Further, when measuring the behavior with respect to pitching of the vehicle, the upper plate 72 of the vehicle support 7 rotates 90 degrees as shown in FIG. 2.

Also, a center line C marked on the vehicle is set to correspond to a data processed reference position of the screen of a monitor 96 by regulating the position of the camera 91 in a similar manner, then is fixed repeatedly as a method of measuring the roll.

Further, as shown in FIG. 3, in case the front side of the test vehicle is disposed to face the driving member 3, the squat property of the vehicle can be measured, and in case the rear side of the test vehicle is disposed to face the driving member 3, the dive property of the vehicle can be measured.

As described above, the invention provides a dynamic behavior test system of a vehicle which can precisely and easily test dynamic behavior of a vehicle such as rolling and pitching generated in a vehicle, whereby the vehicle can be properly designed thereby improving ride comfort and stability.

Although preferred embodiments of the present invention have been described in detail hereinabove, it should be clearly understood that many variations and/or modifications of the basic invention concepts herein taught which may appear to those skilled in the present art will still fall within the spirit and scope of the present invention, as defined in the appended claims.

What is claimed is:

1. A dynamic behavior test system of a vehicle, comprising:

a circumferential driving road;

a vehicle support for placing a test vehicle thereover, said test vehicle being marked with at least two reference points defining a reference line;

a driving member for rotating said vehicle support along said circumferential driving road;

means for detecting changes in the positions of said at least two reference points when said vehicle support with said test vehicle placed thereover is rotated along said circumferential driving road; and means for calculating the values representing dynamic behaviors of the test vehicle based on said detected changes in the positions of said at least two reference points.

2. The dynamic behavior test system of claim 1, wherein said circumferential driving road includes at least one rail.

3. The dynamic behavior test system of claim 1, wherein said vehicle support includes an upper plate over which the test vehicle is placed and a lower plate opposite said upper plate, said upper plate being rotatable with respect to the lower plate in a range of 0 to 180 degrees.

4. The dynamic behavior test system of claim 1, wherein said vehicle support includes means for sensing a reacting force of a wheel of the test vehicle.

5. The dynamic behavior test system of claim 1, wherein said dynamic behaviors of the test vehicle includes rolling of the test vehicle.

6. The dynamic behavior test system of claim 1, wherein said dynamic behaviors of the test vehicle includes pitching of the test vehicle.

7. The dynamic behavior test system of claim 1, wherein said dynamic behaviors of the test vehicle includes rolling and pitching of the test vehicle.

8. The dynamic behavior test system of claim 1, wherein said means for detecting changes includes means for detecting changes in the x and y coordinates of each of said at least two reference points.

9. The dynamic behavior test system of claim 1, wherein said means for calculating includes an arithmetic and logic unit for calculating a value representing the dynamic behavior of the test vehicle.

10. The dynamic behavior test system of claim 1, wherein said means for detecting changes includes a camera for optically detecting changes in the positions of said at least two reference points.

11. The dynamic behavior test system of claim 4, wherein said means for sensing a reacting force is disposed over an upper plate of said vehicle support.

12. The dynamic behavior test system of claim 4, wherein said means for sensing a reacting force includes:

a wheel support for supporting the wheel of the test vehicle;

an air bearing defined by a groove formed over the vehicle support and the wheel support; and a sensor for measuring the reacting force applied to the wheel support and the air bearing.

13. The dynamic behavior test system of claim 12, wherein said means for sensing a reacting force includes means for transferring a value representing a reacting force measured by said measuring sensor to said means for calculating, and wherein said means for calculating includes means for cross-checking between the calculated value and the transferred value.

14. A method for measuring dynamic behaviors of a test vehicle, comprising steps of:

marking a test vehicle with at least two points defining a reference line;

rotating said test vehicle along a circumferential driving road;

detecting changes in the positions of said at least two reference points; and calculating the values representing dynamic behaviors of said test vehicle based on said detected changes in the positions of said at least two reference points.

15. The method for measuring dynamic behavior of a test vehicle of claim 14, further comprising sensing a reacting force of a wheel of said test vehicle, and cross-checking between said calculated value and a value representing said sensed reacting force.

* * * * *